(12) United States Patent
Price et al.

(10) Patent No.: US 6,562,101 B1
(45) Date of Patent: ***May 13, 2003

(54) PROCESSING ELECTRIC ARC FURNACE DUST THROUGH A BASIC OXYGEN FURNACE

(75) Inventors: Kenneth S. Price, Zionsville, IN (US); Kim Lenti, South Holland, IL (US)

(73) Assignee: Heritage Environmental Services, LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/068,705

(22) Filed: Feb. 6, 2002

(51) Int. Cl.[7] ................................................. C21B 15/00
(52) U.S. Cl. ........................... 75/433; 75/10.36; 75/961; 266/142
(58) Field of Search ............................ 266/142; 75/961, 75/10.36, 433

(56) References Cited

U.S. PATENT DOCUMENTS 3,770,416 A * 11/1973 Goksel ........................ 75/487
4,673,431 A * 6/1987 Bricmont .................... 423/200
5,554,207 A * 9/1996 Bogdan et al. ............... 75/500
6,126,714 A * 10/2000 Lynn et al. .................. 75/316

* cited by examiner

*Primary Examiner*—Roy King
*Assistant Examiner*—Andrew Wessman
(74) *Attorney, Agent, or Firm*—Baker & Daniels

(57) ABSTRACT

Methods and apparatus for processing electric arc furnace ("EAF") dust through a basic oxygen furnace (BOF) to recover iron value from the EAF dust and concentrate zinc from the EAF dust into a material useful as a feed in zinc manufacturing processes. The method results in the reduction of the burden for the regulatory tracking of EAF dust. In addition, the method provides economic savings which result from the reduction of processing fees and the recovery of the value of iron and zinc materials. The apparatus involves the use of existing equipment that is used to recover iron value from other materials generated at steel making facilities, or the installation of new equipment for the purpose of iron reuse.

16 Claims, 1 Drawing Sheet

PROCESSING ELECTRIC ARC FURNACE DUST THROUGH A BASIC OXYGEN FURNACE

TECHNICAL FIELD

The present invention relates to electric arc furnace dust, and more particularly to methods and apparatus for processing electric arc furnace dust as a feedstock to recover iron and zinc value.

BACKGROUND ART

Electric Arc Furnace (EAF) dust is a waste material that is generated during the production of steel in electric arc furnaces. During the production of steel, EAF dust is captured and collected for either disposal or recycle.

The major components in EAF dust are iron (up to 50 wt %) and zinc (up to 30 wt %), usually in the oxide form. In addition, EAF dust contains smaller quantities of calcium, magnesium, manganese, chloride, lead, cadmium and other trace elements. The steel industry generates about 30 to 40 pounds of EAF dust for each ton of steel produced in electric arc furnace facilities. The estimated generation of EAF dust in the United States in 1997 was approximately 900,000 tons with about 40% being disposed in landfills.

EAF dust is a listed hazardous waste (K061) under United States environmental regulations. Under this regulatory program, EAF dust is subject to specific record keeping, handling requirements and processing costs when it is recycled or disposed.

However, EAF dust contains significant quantities of iron that make it valuable for use directly in steel making processes as a substitute for other iron containing materials such as scrap steel, hot metal, sinter dust, basic oxygen furnace ("BOF") sludge and other iron oxides present at steel making facilities. In addition, EAF dust also contains significant quantities of zinc which makes it valuable as a feed for zinc manufacturing processes.

Present methods for handling EAF dust include processing it in Waelz Kilns, rotary hearth furnaces and flame reactor processes to recover zinc. EAF dust is also subject to stabilization processes followed by landfill disposal.

Generally, it can be economical to subject EAF dust having a high zinc content to existing zinc recovery procedures, and send EAF dust having a low zinc content to landfills for disposal as a waste.

Other process methods for recovering zinc and/or iron from EAF dust have been attempted with limited success. Such processes include thermal processes, hydrometallurgical processes or combinations thereof. In most cases these processes were not successful because they are expensive to build, expensive to operate and/or they cannot be used to process all of the EAF dust material, so that waste material remains that still must be disposed.

In addition, all processes are subject to significant environmental regulatory requirements under the Resource Conservation and Recovery Act ("RCRA"). This is due to the fact that current processes have been specifically developed for the sole purpose of processing EAF dust as a hazardous waste. To date, those in the steel industry view EAF dust as a listed hazardous waste, and accordingly conclude that using EAF dust as any type of feed or reactant will necessarily result in the formation, generation or preservation of a hazardous material.

Southwick, "Recovery of Iron and Zinc From Steel Mill Wastes," a presentation from a Conference Organized by Gorham/Inertech in Pittsburgh. Pa. on May 17–19, 1999 provides a summary of various processes proposed to recover iron and zinc from mill wastes. In addition, U.S. Pat. Nos. 4,605,435, 5,013,532, 5,082,493, 5,435,835, 5,439,505, 5,493,580, 5,538,532, 5,667,553, 5,879,617, 5,993,512, 6,102,982, 6,120,577, and 6,221,124 are directed to various methods and apparatus for processing EAF dust.

The present invention is directed to methods and apparatus for processing electric arc furnace dust as a feedstock for a BOF.

DISCLOSURE OF THE INVENTION

According to various features, characteristics and embodiments of the present invention which will become apparent as the description thereof proceeds, the present invention provides a method of processing electric arc furnace dust as a feedstock which involves:

providing electric arc furnace dust from a source thereof;

providing a basic oxygen furnace;

feeding an iron containing material into the basic oxygen furnace;

feeding the electric arc furnace dust into the basic oxygen furnace together with the iron containing material; and obtaining an iron product and a sludge/dust byproduct from the basic oxygen furnace.

The present invention further provides a method of recovering iron value from electric arc furnace dust which involves:

providing electric arc furnace dust;

providing a basic oxygen furnace;

feeding an iron containing material into the basic oxygen furnace;

feeding the electric arc furnace dust into the basic oxygen furnace together with the iron containing material so that iron oxide from the electric arc furnace dust is reduced and recovered in an iron product; and removing the iron product and a sludge/dust byproduct from the basic oxygen furnace.

The present invention also provides for the combination of an electric arc furnace and a basic oxygen furnace for producing and processing electric arc furnace dust as a feedstock which combination includes:

an electric arc furnace;

a first feed of iron containing material going into the electric arc furnace;

an iron product and electric arc furnace dust obtained from the electric arc furnace;

a basic oxygen furnace; and a feed or iron containing material and the obtained electric arc furnace dust going into the basic oxygen furnace;

an iron product and a sludge/dust byproduct obtained from the basic oxygen furnace.

According to one embodiment the combination further includes a zinc recovery system into which at least a portion of the obtained sludge/dust byproduct is feed as a feedstock.

BRIEF DESCRIPTION OF DRAWINGS

The present invention will be described with reference to the attached drawing which are given as non-limiting examples only, in which.

BEST MODE FOR CARRYING OUT THE INVENTION

Figure 1:
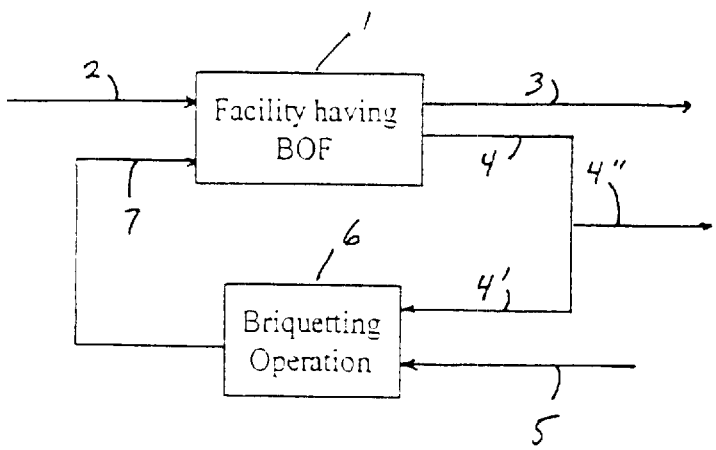
FIG. 1 is a flow diagram which illustrates one method of operating a basic oxygen furnace according to one embodiment of the present invention.

The present invention involves methods and apparatus for processing of EAF dust from an electric arc steel making operation through an iron recovery process at a basic oxygen furnace (BOF) steel making process. The method which involves the use of a BOF increases the volume of iron available for processing and provides for the production of a higher zinc content product that is more attractive for use as a feed for zinc recovery and/or manufacturing. These features of the invention can be adapted and implemented with a minimal investment of capital by using existing infrastructures available at BOF facilities.

There are numerous reasons which support the feasibility for commercial success of the present invention. For example, by processing EAF dust through an existing iron recovery process as a substitute or partial substitute for other feed materials or reactants, the EAF dust would no longer be considered a listed hazardous waste in the United States under RCRA waste rules. Such processing would therefore serve the purpose of eliminating a significant regulatory burden on the generator of the EAF dust and would fulfill the goal of RCRA by enhancing the recovery of resources from materials that had been previously considered to be waste materials.

Another factor that supports the feasibility for commercial success of the present invention involves the fact that at the present time EAF dust generators must pay a processing fee to process or dispose of their EAF dust. In this regard, the ability to have EAF dust processed, even for a fee, is limited by the zinc concentration of the EAF dust. The processing fee for lower zinc concentration dusts is sufficiently high to preclude recycle for zinc recovery. Accordingly, many EAF dust generators prefer to have their EAF dust stabilized to meet disposal standards prior to sending it to landfills. According to the present invention, the EAF dust is processed so that its zinc concentration is increased. Thus, while it may not eliminate the processing fees, the process method of the present invention makes it possible for EAF dusts with lower zinc content to be processed to reclaim zinc value instead of disposed in landfills.

Another factor that supports the feasibility for commercial success of the present invention involves the fact that the zinc concentration of the material produced by BOF facilities will increase to levels which will allow more options for processing the zinc rich product for recovery of the zinc. The higher concentration of zinc in these materials will be attractive for use in a wider variety of zinc manufacturing facilities.

The present invention takes advantage of the principle that, if a material can be used as a substitute for other raw materials in an existing process, it is not a waste and therefore in the United States cannot be a hazardous waste subject to RCPA regulations. A similar approach may apply or be adapted in other countries' regulations.

Waste iron oxides (not EAF dust) are presently being processed to recover their iron value at several BOF facilities. These materials are dried and formed into shapes or charges that are suitable for addition to a BOF with other charge materials. The present invention is based in part on the observation that since the most abundant element in EAF dust is iron, EAF dust would be a suitable material for processing in this same manner, i.e. as a feedstock for a BOF. The fact that processing EAF dust in this manner would involve the use of existing equipment eliminates the need for costly capital equipment additions for this processing for many BOF facilities. Also, the fact that processes for iron oxide reuse are active, conventional processes make the addition of EAF dust to the overall process a minor change in the operation of a BOF facility.

As noted above, to date the recognition of EAF dust as a listed hazardous waste, has prevented the processing of EAF dust according to the present invention and has moreover prevented those in the industry from even considering such an idea, because of the common conclusion that using EAF dust as any type of feed or reactant will necessarily result in the formation, generation or preservation of a hazardous material.

According to the present invention, waste iron oxides, contained in the EAF dust, are actively recovered in basic oxygen furnace (BOF) steel making facilities as the EAF dust is used as a substitute for, or in addition to, hot metal and steel scrap that is fed into BOF's.

This recovery can be accomplished by first making or incorporating the EAF dust into a suitable form that can be charged into the a BOF furnace in a manner acceptable to the BOF facility. For example, the EAF dust can be combined with other materials including other iron oxide materials and formed into briquettes or pellets using conventional briquetting or pelletizing procedures and apparatus. It is also possible to inject the EAF dust into a BOF furnace without subjecting it to briquetting or pelletizing procedures.

BOF facilities also generate dust during their operation that is typically captured in wet scrubber systems. These wet scrubbers produce a sludge/dust that contains the same metals as EAF dust, but usually in lower concentrations. The concentrations of volatile metals in the sludge/dust (e.g., zinc, lead and cadmium) depend on the concentrations of these compounds in the materials charged to a BOF unit. Typically volatile metals charged to a BOF will be captured and collected in the dust control system and end up in the BOF sludge/dust. As the BOF sludge/dust is reused in the process, the concentration of these compounds will build up. The addition of EAF dust to the BOF process will not change the basic list of compounds in the BOF sludge/dust, it will only increase the rate at which they concentrate in the system.

Since the recovery of iron value from EAF dust is no different than the present practice of recovering iron value from other iron oxide materials at steel making facilities, the substitution or addition of EAF dust into BOF iron recovery processes would cause EAF dust to be a feedstock rather than being considered a waste. If the EAF dust is not a waste, it could no longer be considered a hazardous waste.

In addition to re-characterizing EAF dust from a waste or hazardous waste to a feedstock, the process for recovering iron value from EAF dust would have the added advantage of increasing the zinc concentration in the sludge/dust collected in the dust collection system for the BOF. The BOF sludge/dust would continue to be returned to the BOF process to maximize the iron recovery until the zinc content of the sludge/dust reaches a point where the recovery process attains a desired economic operating condition or the zinc concentration reaches the practical limits for the operation of the BOF. Since BOF sludge/dust with a higher zinc content results in a material that has a higher value for use in zinc manufacturing processes (i.e. provides more flexibility for the use), zinc enriched materials derived from the process of the present invention become more valuable raw materials for other processes.

The present invention involves the receiving or transferring of EAF dust to a BOF facility having an iron reuse process. The EAF dust is processed into formed units with the addition of a reductant material such as carbon, and if necessary, a binder material to help the stability of the formed units. The formed units are then added into the BOF process with other conventional charge materials such as hot metal, scrap and other additives.

The iron portion of the EAF dust is recovered in the metal bath. Volatile metal components contained in the EAF dust such as zinc, lead, cadmium, chloride, etc. are driven off during the BOF process as volatile materials and/or dust. These vapors and/or dust which comprise the volatile materials is collected by a hood system at the BOF process and transported to a dust collection system.

Normally the material in dust collection systems for BOF facilities have fairly low zinc content, due to the low quantity of scrap used in BOF steel making. This dust can be collected in a wet scrubber as a sludge or other type of dust collection system. The low zinc and high iron content of conventional BOF sludge/dust allows it to continue to be returned to the iron recovery process.

The addition of EAF dust according to the present invention with its higher zinc content results in a higher zinc content in the BOF sludge/dust. The iron content will continue to be high allowing the BOF sludge/dust it to be beneficially reused for iron recovery. However, at some point, as the EAF dust is repeatedly returned to the BOF for iron reuse processing, the zinc content in the BOF sludge/dust will reach concentration at which it become economical to remove a portion of the BOF sludge/dust for recovery of the zinc value. After steady state operation, the proportions of the BOF sludge/dust returned to the BOF and that removed for recovery of zinc value will depend on the zinc content of the EAF dust, the percent of EAF dust used in the iron reuse process and the value of the zinc containing sludge/dust. Such determinations are within the skill of those familiar with steel processing and zinc recovery.

The quantity of BOF sludge/dust with high zinc will be significantly less than the quantity of EAF dust added to the BOF iron process. The BOF sludge/dust will also have a higher zinc content and therefore be more valuable than the original EAF dust (which would typically incur a processing fee if disposed by other means). This combination of generating less material and lowering processing cost provide significant economic incentive for the use of present invention. The BOF facility could charge a processing fee to receive EAF dust from other sources. Otherwise, the BOF facility could reduce its own operating costs by processing EAF dust from its own facility. Thus, it can be seen that the processing of EAF dust in a BOF has significant financial incentive.

The present invention further eliminates or at least reduces disposal of waste into landfills thus reducing the environmental impact associated with EAF dust.

Within the hazardous waste regulatory system of the United States the processing of EAF dust in a BOF facility according to the present invention to both recover iron and improve the value of the zinc fraction would eliminate it from the "listed waste" category for hazardous wastes. The value of having the EAF dust that is subject to the present invention eliminated from the "listed waste" status would be a significant advantage for the generators of EAF dust and would allow zinc manufacturers to more easily use the zinc rich product.

FIG. 1 is a flow diagram which illustrates one method of operating a basic oxygen furnace according to one embodiment of the present invention. In FIG. 1, a facility having a basic oxygen furnace (BOF) 1, receives a conventional feed 2 for producing a steel product shown as output 3. During production of steel, a BOF sludge/dust byproduct is also produced and shown as output 4. The BOF sludge/dust byproduct 4 can be processed to recover zinc.

According to the present invention, electric arc furnace dust (EAF dust) is used as a feed stock 5 for the modified steel processing operation. In the embodiment of the present invention that is depicted in FIG. 1, the EAF dust feedstock 5 is combined with a portion of the BOF sludge/dust byproduct 4' and fed to a briquetting operation 6. The resulting briquettes are fed into the BOF 1 as an additional feed 7.

The feed 2 of the BOF can include hot metal obtained from iron ore, scrap iron, limestone and various alloys. In addition to the EAF dust 5 and BOF sludge/dust byproduct 4', the briquetting operation can receive conventional binders.

In operation, the portion of the BOF sludge/dust byproduct 4' returned to the BOF 1 is dependent on the zinc concentration of the BOF sludge/dust byproduct 4' that is removed for zinc processing.

FIG. 1 is merely exemplary, and it is to be understood that the EAF dust could be fed into the BOF without being combined with the BOF sludge/dust byproduct and without briquetting if desired. However, returning a portion of the BOF sludge/dust byproduct into the BOF will increase the zinc concentration in the BOF sludge/dust byproduct stream that is withdrawn.

Figure 2:
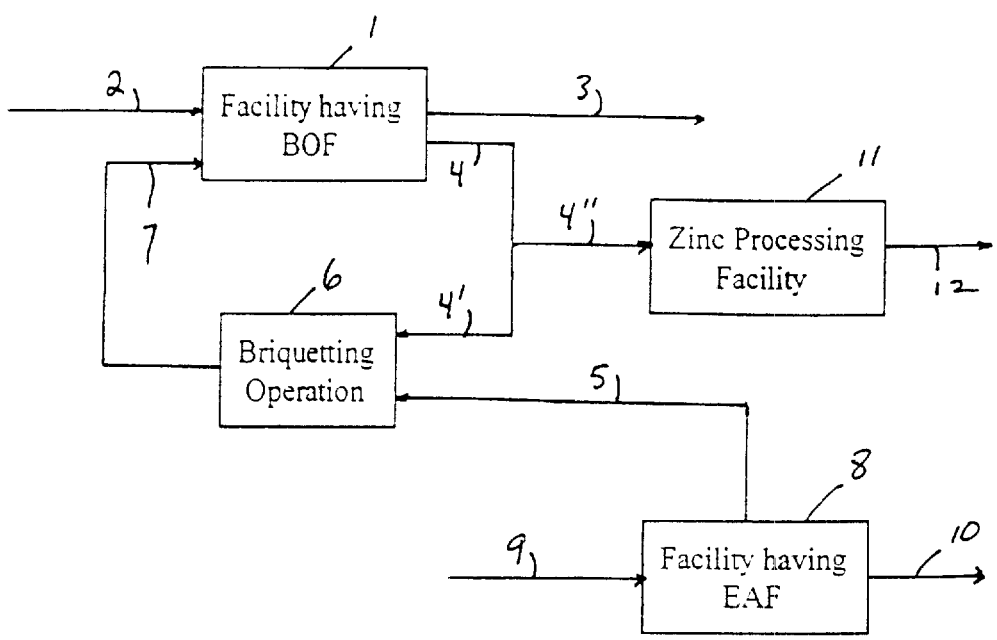
FIG. 2 is a flow diagram which illustrates another method of operating a basic oxygen furnace according to one embodiment of the present invention and the apparatus involved.

FIG. 2 is a flow diagram which illustrates another method of operating a basic oxygen furnace according to one embodiment of the present invention and the apparatus involved. Common reference numerals are used in FIGS. 1 and 2 to identify similar elements/apparatus.

In addition to the BOF facility 1 and briquetting operation 6 in FIG. 1, FIG. 2 depicts a facility 8 which includes an EAF. The EAF receives an iron containing feed 9 and produces a steel product shown as output 10, and EAF dust which is depicted as feed 5 in FIGS. 1 and 2.

FIG. 2 also depicts a zinc processing facility or process 11 which receives sludge/dust stream 4' from the BOF and produces a zinc product steel product shown as output 12.

The following are exemplary of applicational uses of the present invention. As can be understood, the process has a variety of alternatives depending on zinc concentration of the EAF dust, the final zinc concentration of the BOF sludge/dust when it is sold for processing at a zinc recovery facility and the present status of iron reuse at the BOF facility. The following are examples of several of these alternatives which provide an idea of how the process could be applied and operated. It is to be understood that the following are examples are non-limiting. In the Examples and throughout percentages are by weight unless otherwise indicated.

EXAMPLE 1

This example is directed to the processing of EAF dust that has a zinc concentration of 10 wt %. If the BOF process is operated to remove BOF sludge/dust when the zinc concentration in the BOF sludge/dust reaches 30 wt %, the quantity of BOF sludge/dust removed would be approximately one third of the quantity of EAF dust processed. The economic value of this process includes the fee charged by the BOF facility for receiving and processing of the EAF dust, plus the value of the iron and zinc recovered, minus the cost of processing the EAF dust into appropriate unit shapes for use in the BOF, increased costs for additional hot metal use and any costs associated with the sale of the zinc containing sludge/dust. As the quantity of EAF dust processed increases and the quantity of BOF sludge/dust requiring disposal decreases, the value of this process improves. The process can be adapted for use in either an existing iron reuse process at a BOF facility or in the evaluation of a new iron reuse system at a BOF facility.

EXAMPLE 2

This example is directed to the processing of EAF dust that has a zinc concentration of 20%. If the BOF process is run without removal of any BOF sludge/dust until the zinc concentration in the BOF sludge/dust reaches 40%, the quantity of BOF sludge/dust removed would be approximately half of the quantity of EAF dust added to the process. The evaluation of the economic value of this example would be calculated in the same manner as in Example 1 above.

EXAMPLE 3

This example is directed to an EAF facility that has the necessary apparatus to form EAF dust into appropriate unit shapes or forms that are acceptable for direct use in a BOF facility. The EAF dust in the acceptable unit shapes or forms could be added directly to the BOF with the other charge material. In order to return BOF sludge/dust to the BOF, the BOF facility would still need equipment to form the BOF sludge/dust into acceptable unit shapes or forms. The evaluation of the economic value of this example would be calculated in the same manner as the previous examples.

As can be understood, processing EAF dust in a BOF according to the present invention can provide practical and economical advantages for both the EAF facility generating the dust and the BOF facility used to process the dust. The process of the present invention will be especially attractive for EAF facilities with low concentrations of zinc that are unable to have their EAF dust economically processed. The use of a BOF facility according to the present invention to concentrate zinc and recover iron provides EAF facilities that produce low zinc content EAF dust with an alternative to sending their EAF dust to landfills. The BOF facility would reuse the iron from the EAF dust and be paid a processing fee for using the EAF dust. In addition, the generation of BOF sludge/dust with higher zinc content would provide more opportunities for zinc processing facilities to handle these materials. Since most of the zinc processing systems are capacity limited, higher zinc content will allow more zinc to be recovered at existing zinc processing facilities.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A method of processing electric arc furnace dust as a feedstock which comprises:

providing electric arc furnace dust from a source thereof, said electric furnace duct containing volatile metals;

providing a basic oxygen furnace;

feeding an iron containing material into the basic oxygen furnace;

feeding the electric arc furnace dust and volatile metals contained therein into the basic oxygen furnace together with the iron containing material; and obtaining an iron product and a sludge/dust byproduct from the basic oxygen furnace.

2. A method of processing electric arc furnace dust as a feedstock according to claim 1, further comprising returning a portion of the sludge/dust byproduct to the basic oxygen furnace.

3. A method of processing electric arc furnace dust as a feedstock according to claim 2, wherein the electric arc furnace dust and the portion of the sludge/dust byproduct that is returned to the basic oxygen furnace are formed into one of pellets and briquettes before being fed into the basic oxygen furnace.

4. A method of processing electric arc furnace dust as a feedstock according to claim 1, wherein the iron containing material comprises at least one of scrap steel, hot metal, sinter dust, and basic oxygen furnace sludge/dust from another source.

5. A method of processing electric arc furnace dust as a feedstock according to claim 1, wherein the electric arc furnace dust has a zinc content and the sludge/dust byproduct has a zinc content that is greater than the zinc content of the electric arc furnace dust.

6. A method of processing electric arc furnace dust as a feedstock according to claim 5, further comprising returning a portion of the sludge/dust byproduct to the basic oxygen furnace to cause an increase in the zinc concentration of the sludge/dust byproduct.

7. A method of processing electric arc furnace dust as a feedstock according to claim 1, further comprising providing the obtained sludge/dust byproduct as a feed for a zinc recovery process.

8. A method of processing electric arc furnace dust as a feedstock according to claim 2, further comprising separating a portion of the sludge/dust byproduct from the obtained sludge/dust byproduct and providing the separated portion of sludge/dust byproduct as a feed for a zinc recovery process.

9. A method of processing electric arc furnace dust as a feedstock according to claim 1, further comprising combining the electric arc furnace dust with a reductant material prior to feeding it into the basic oxygen furnace.

10. A method of recovering iron value from electric arc furnace dust which comprises:

providing electric arc furnace dust, said electric furnace duct containing volatile metals;

providing a basic oxygen furnace;

feeding an iron containing material into the basic oxygen furnace;

feeding the electric arc furnace dust and volatile metals contained therein into the basic oxygen furnace together with the iron containing material so that iron oxide from the electric arc furnace dust is reduced and recovered as an iron product; and removing the iron product and a sludge/dust byproduct from the basic oxygen furnace.

11. A method of recovering iron value from electric arc furnace dust according to claim 10, further comprising recovering zinc value from the electric arc furnace dust by processing the sludge/dust byproduct to recover zinc therein.

12. A method of recovering iron value from electric arc furnace dust according to claim 10, further comprising returning a portion of the sludge/dust byproduct to the basic oxygen furnace.

13. A method of recovering iron value from electric arc furnace dust according to claim 12, further comprising separating at least a portion of the sludge/dust byproduct from the obtained sludge/dust byproduct and providing the separated portion of sludge/dust byproduct as a feed for a zinc recovery process.

14. A method of recovering iron value from electric arc furnace dust according to claim 12, wherein the electric arc furnace dust and the portion of the sludge/dust byproduct that is returned to the basic oxygen furnace are formed into one of pellets and briquettes before being fed into the basic oxygen furnace.

15. A method of recovering iron value from electric arc furnace dust according to claim 10, wherein the iron containing material comprises at least one of scrap steel, hot metal, sinter dust, and basic oxygen furnace sludge/dust from another source.

16. A method of recovering iron value from electric arc furnace dust according to claim 10, further comprising combining the electric arc furnace dust with a reductant material prior to feeding it into the basic oxygen furnace.

* * * * *